(12) United States Patent
Criel et al.

(10) Patent No.: US 8,163,228 B2
(45) Date of Patent: Apr. 24, 2012

(54) METHOD FOR MANUFACTURING A PLASTIC FUEL TANK

(75) Inventors: Bjorn Criel, Sint-Martens-Lennik (BE); Hervé Lemoine, Tracy le Mont (FR)

(73) Assignee: Inergy Automotive Systems Research (Societe Anonyme), Bruxelles (BE)

( * ) Notice: Subject to any disclaimer, the term of this patent is extended or adjusted under 35 U.S.C. 154(b) by 1044 days.

(21) Appl. No.: 11/908,336

(22) PCT Filed: Mar. 10, 2006

(86) PCT No.: PCT/EP2006/060635
§ 371 (c)(1),
(2), (4) Date: Mar. 10, 2008

(87) PCT Pub. No.: WO2006/095024
PCT Pub. Date: Sep. 14, 2006

(65) Prior Publication Data
US 2008/0224363 A1     Sep. 18, 2008

(30) Foreign Application Priority Data

Mar. 11, 2005   (FR) ...................... 05 02414

(51) Int. Cl.
*B29C 49/20* (2006.01)
(52) U.S. Cl. ...................... 264/516; 264/523
(58) Field of Classification Search .......... None
See application file for complete search history.

(56) References Cited

U.S. PATENT DOCUMENTS

| 4,719,072 A * | 1/1988 | Kojima et al. ............. 264/515 |
|---|---|---|
| 5,343,902 A | 9/1994 | Ramioulle |
| 6,138,857 A | 10/2000 | Keller |
| 6,338,420 B1 | 1/2002 | Pachciarz et al. |
| 6,422,610 B1 | 7/2002 | Chang |
| 6,866,812 B2 | 3/2005 | Van Schaftingen et al. |
| 7,166,253 B2 | 1/2007 | Van Schaftingen et al. |
| 7,168,466 B2 | 1/2007 | Ganachaud et al. |
| 2007/0228722 A1 | 10/2007 | Plissart et al. |

FOREIGN PATENT DOCUMENTS

| DE | 42 29 717 A1 | 3/1994 |
|---|---|---|
| EP | 1 006 014 A2 | 6/2000 |
| EP | 1 110 697 A2 | 6/2001 |
| FR | 2 375 976 | 7/1978 |
| FR | 2 873 321 A1 | 1/2006 |
| GB | 1 410 215 | 10/1975 |
| GB | 2 188 394 A | 9/1987 |
| SU | 848868 | 11/1979 |
| WO | WO 01/21991 A1 | 3/2001 |
| WO | WO 2004/024487 A1 | 3/2004 |

(Continued)

OTHER PUBLICATIONS

U.S. Appl. No. 11/658,085, filed Jan. 22, 2007, Criel et al.

(Continued)

*Primary Examiner* — Monica A Huson
(74) *Attorney, Agent, or Firm* — Oblon, Spivak, McClelland, Maier & Neustadt, L.L.P.

(57) ABSTRACT

Method for manufacturing a plastic fuel tank by moulding a parison in which, during the moulding operation, a pipe (3) is attached to the parison at at least two points, the said pipe being deformable.

9 Claims, 1 Drawing Sheet

FOREIGN PATENT DOCUMENTS

WO    WO 2006/008308 A1    1/2006

OTHER PUBLICATIONS

U.S. Appl. No. 11/575,421, filed Mar. 16, 2007, Criel.

U.S. Appl. No. 11/718,161, filed Apr. 27, 2007, Criel et al.
U.S. Appl. No. 11/721,785, filed Jun. 14, 2007, Criel et al.
U.S. Appl. No. 11/721,775, filed Jun. 14, 2007, Criel et al.
U.S. Appl. No. 11/993,424, Criel, et al.
U.S. Appl. No. 11/721,735, filed Jun. 14, 2007, Mabed, et al.

* cited by examiner

METHOD FOR MANUFACTURING A PLASTIC FUEL TANK

The present invention relates to a method for manufacturing a plastic fuel tank, to a fuel tank resulting from this method, and to a ventilation pipe intended for the said method/tank.

Fuel tanks fitted to vehicles of varying kinds are generally required to comply with standards for leak resistance and permeability in keeping with the type of usage for which they are designed and the environmental requirements with which they have to comply. At the present time, requirements concerning the limiting of pollutant emissions into the atmosphere and into nature in general are becoming more stringent both in Europe and worldwide.

One particular idea for limiting these emissions has been to position the components (ventilation lines, valves, baffles, stiffeners etc.) inside the tank and/or inside the filling pipe (see in particular application WO 2004/024487 in the Applicant's name). However, if these components are fixed to the tank after the tank has been moulded, it is generally necessary to make at least one opening in the tank so that the said components can be introduced and fixed therein. There can therefore be leakage problems in the vicinity of this opening.

The Applicant therefore developed a moulding method beginning with a parison comprising at least one slot to allow the introduction (and fixing) of the components as the tank is actually being moulded, so that openings do not have to be cut into it (see in particular application EP 1110697). However, the Applicant found that with such a method, during post-moulding cooling, the tank suffers an appreciable amount of shrinkage (typically of around 3%) whereas the parts that were integrated into it during moulding were heated only slightly and therefore suffer much less shrinkage, even if they too are made of plastic (since there can be large differences of thermal expansion/shrinkage between polymers). This can introduce unacceptable deformations (and therefore internal tensions) if a pipe is fixed by both its ends to the tank. And yet, such fixing is advantageous particularly in the case of ventilation lines having valves at their ends.

It is therefore an object of the invention to provide a method of integrating a pipe into a plastic fuel tank during its manufacture by moulding, without generating deformations following cooling of the tank.

To this end, the invention relates to a method for manufacturing a plastic fuel tank by moulding a parison in which, during the moulding operation, a pipe is attached to the parison at least two points, the said pipe being deformable between these two points by virtue of the presence of a bend which is stretched during the attachment of the pipe to the parison.

"Fuel tank" here refers to a sealed tank capable of storing fuel under diverse and varying environmental and use conditions. One example of this tank is that fitted to motor vehicles.

The fuel tank according to the invention is made of plastic.

The term "plastic" is used here to denote any material comprising at least one synthetic resin polymer.

All types of plastic may be suitable. Very suitable plastics belong to the category of the thermoplastics.

The term "thermoplastic" here denotes any thermoplastic polymer, including thermoplastic elastomers, and their blends. The term "polymer" denotes homopolymers and copolymers (especially binary or ternary copolymers). Without implying any limitation, examples of such copolymers are: random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials include those that exhibit polydispersion in their molecular weight.

In particular, polyolefins, thermoplastic polyesters, polyketones, polyamides and copolymers thereof may be used. A blend of polymers or copolymers may also be used, as may a blend of polymeric materials with inorganic, organic and/or natural fillers such as the following non-exhaustive list: carbon, salts and other inorganic derivatives, and natural or polymeric fibres. It is also possible to use multilayer structures consisting of stacked layers bonded together and comprising at least one of the polymers or copolymers described above.

One polymer often used is polyethylene. Excellent results have been obtained with high-density polyethylene (HDPE).

The wall of the tank may consist of a single layer of thermoplastic material or two layers. One or more other possible supplementary layers may advantageously consist of layers of liquid and/or gas-barrier materials. The nature and thickness of the barrier layer is preferably chosen to minimize the permeability of the liquids and gases that will be in contact with the inner surface of the tank. This layer is preferably based on a barrier resin, that is a fuel-impervious resin such as EVOH (ethylene/vinyl alcohol copolymer). Alternatively, the tank may be given a surface treatment (fluorination or sulphonation) to make it impermeable to the fuel.

The tank according to the invention preferably includes an EVOH-based barrier layer in between HDPE-based outer layers.

In accordance with the invention, the tank is made by moulding a parison. "Parison" means a preform, generally extruded, which is designed to form the wall of the tank after being moulded to the required forms and dimensions. This preform need not necessarily be in one piece.

Advantageously, the parison therefore actually consists of two separate pieces, which may be two sheets, for example. However, as a matter of preference, these pieces result from the cutting of an extruded tubular parison as described in the abovementioned application EP 1110697, the content of which is for this purpose introduced by reference into the present application. In this variant, following extrusion of a single parison, the parison is cut lengthwise along two diametrically opposite lines to give two separate parts (sheets).

Compared with moulding two sheets that have been extruded separately, and whose thickness is constant, this approach makes it possible to use parisons of variable thickness (variable meaning not constant along their length) obtained by means of a suitable extrusion device (generally an extruder fitted with a die with a mandrel whose position is adjustable). Such a parison allows for the thickness reduction which occurs during moulding at certain points of the parison, due to the variable rates of deformation of the material in the mould.

After a parison has been moulded in two pieces, one piece generally forms the lower wall and the other the upper wall of the fuel tank.

The present invention is very suitable for fixing a pipe at two points on one parison part and in particular on the upper part (wall) of the tank (whether or not the latter is moulded from a two-piece parison). These points are generally several centimeters or tens of centimeters apart.

For the purposes of the invention, "pipe" means an elongate channel open at its ends and of basically tubular section. The pipe according to the invention may be a ventilation pipe, a fuel pump line, a line for returning fuel from the engine to the tank (in the case of diesel engines) or a filling line; an electric line (in which case the pipe is generally the sheath of an electric cable) or the like. The pipe is preferably used to convey something (such as a fluid or electricity). According to the invention the pipe is fixed to the tank (or strictly speaking to the parison, the word "tank" referring to the finished moulded object) at least two points, generally by its ends. This is not intended to imply that the present invention does not include "spider" pipe systems (i.e. having several arms) fixed to the wall of the tank at least two points. In the case of pipes fixed to the tank at more than two points, it is advantageous for each portion of the pipe lying between two fixing points to be deformable.

According to the invention, the pipe is fixed/attached to the parison intended to form the fuel tank after moulding. This means that it is either directly in contact with the wall of the tank, or connected to an intermediate fixing means which in turn is directly in contact with the tank wall. The said intermediate fixing means may fulfil an active function on the tank. It may for example be a valve. "Contact" here means either mechanical attachment (which can be undone) or a weld (or molecular interpenetration). Welding gives good results from the point of view of permeability and is practical to use in the context of the invention because the parison is molten/softened during the moulding operation. Note that other techniques (preferably also taking advantage of the fact that the parison is molten/softened) can also be used, an example being rivet punching. This technique is described in the Applicant's application FR 04.08196, the content of which is incorporated into the present application by reference.

Although the present invention was developed for the purposes of fixing internal pipes to the tank during moulding, it can also be applied to fixing external pipes to the tank, where shrinkage problems also occur.

The pipe according to the invention can be made of any material appropriate to its function. In the case of a pipe carrying a fluid at a temperature close to the ambient temperature (such as a tank ventilation pipe—the function of which is generally to connect the top of the tank to a canister or device for adsorbing fuel vapours; or a vapour breather line —carrying some of the vapour to the top of the filling pipe when the tank is being filled; or a maximum fuel level fixing line—obstruction of which by the fuel level trips the nozzle; etc.), the main component of this pipe is generally plastic.

According to the invention, the pipe to be fixed is deformable between its two points of attachment to the tank by virtue of the presence of at least one bend. "Deformable" here means that the distance between the two points of attachment of the pipe is variable.

"Bend" here actually means any deformation that allows the pipe to be lengthened when stretched (such as a loop—i.e. a convolution; or one or more corrugations —i.e. bellows, curls). One variant which is very suitable in practice (because it is easy to apply by a simple—preferably hot—deformation of the pipe) is to make at least one bend shaped like an S, a wave or a V (or more strictly a W if the ends of the bend are counted) in the desired region. This makes a sort of spring in the pipe, which is stretched during fastening of the pipe to the parison by an amount (or to an extent) such that it is preferably at rest (or almost at rest) when the moulded tank is cooled.

Generally speaking, the method according to the invention may comprise the following steps:
the parison is placed in a mould;
a core is placed in the mould, inside the parison, the said core carrying the pipe;
the mould is closed;
the parison is pressed against the walls of the mould by internal gas pressure applied through the core and/or by applying a vacuum behind the mould;
the pipe is fixed to the parison with the aid of the core;
if necessary, the plastic is degassed;
the mould is opened to withdraw the core; and
the parison is moulded either by blow moulding (injecting a fluid under pressure into it) or by thermoforming (pulling a vacuum behind the mould).

The mould in this variant of the invention comprises two impressions designed to be in contact with the outer surface of the parison, the parison being inflated onto these impressions by a compressed gas injected inside the parison.

The degassing step (which is necessary in the case of blow moulding, but not of thermoforming) can be carried out in any appropriate way. As a rule, the parison is first pierced (e.g. by pricking it with a needle), and the fluid is then evacuated from the mould (e.g. with the aid of a valve).

The method according to this variant of the invention therefore uses a core to fix the pipe (with its stretched bend) to the parison. This means a component of a size and shape that will allow it to be inserted between the mould impressions. Such a component is described for example in patent GB 1,410,215, the content of which is for this purpose introduced by reference into the present application.

In this variant the core may also be used to blow in the compressed gas required to blow-mould the parison. If the parison to be blow-moulded is in two parts, the core can also be used to keep the edges of these two parts hot during at least some of the steps of the method (usually those preceding the welding of the two parts to create the tank). Two-part parisons are very suitable for this variant as they can be separated when the mould is opened, which simplifies the fixing of the pipe.

Lastly, the core can also be used to at least partly monitor the process. For this purpose, the core may be equipped for example with a video camera for displaying and monitoring the quality of the attachment of the pipe (and of any other components of the tank) by image analysis. One or more sensors for measuring a parameter or parameters such as force, travel, pressure and temperature may also be installed on the core to allow more detailed monitoring of the fixing of the pipe to the parison.

Alternatively, the method according to the invention may comprise the following steps:
two sheets forming the parison are preheated;
the sheets are preformed by thermoforming them in a mould;
the pipe is incorporated into at least one of the sheets by a robot;
the mould is closed again; and
the tank is moulded by thermoforming (pulling a vacuum behind the mould).

The present invention also relates to a plastic fuel tank capable of being obtained by a method as described above.

Such a tank comprises a wall defining an internal volume designed to contain fuel, and a pipe fixed at least two points to this wall, the part of the pipe lying between these two points being deformable by virtue of the presence of a bend which is stretched when the pipe is being attached to the parison.

This pipe is preferably a ventilation pipe that comprises at least one valve and a region that includes a bend, loop or convolution. It is preferably characterized by the presence of a valve at least one of its ends and of at least one region that includes a bend, loop or convolution. This pipe advantageously comprises a valve at each of its ends, and it is via these valves that the pipe is intended to be fixed to a fuel tank.

The reason for this is that in tanks containing several (at least two) pockets (so-called saddle-shaped tanks), at least some of these pockets generally require venting. One practical way of doing this is to provide the pocket or pockets which it is wished to vent with a vent valve, and to connect this valve to a canister via a pipe such as that described above and by a valve placed between the pipe and the canister. A valve like this can perform several functions: prevent the entry of liquid fuel into the canister in the case of a wave or if the vehicle rolls over (the ROV or Roll-Over-Valve function); preventing overfilling (the OFP function); trapping drops of liquid fuel that may be entrained by the vapour (the liquid-vapour separation function) and so forth. The present invention is very suitable for fixing vent pipes connecting together different valves in a fuel tank.

Consequently, the present invention also relates to a method for venting a fuel tank comprising several pockets, in which at least one pocket is provided with at least one vent valve and this valve is connected to a canister via a pipe as described above. In this method, each of the pockets which it is wished to vent is preferably provided with at least one vent valve, these valves are connected together by pipes, and these pipes and valves are connected to a canister via a valve that can perform the ROV, OFP and liquid-vapour separator functions and so forth.

Without implying any limitation, the present invention is illustrated in FIGS. 1 to 3.

FIG. 2 is a schematic illustration of such a pipe (3) as it appears after the tank has been blow-moulded and cooled down, while

Figure 1:
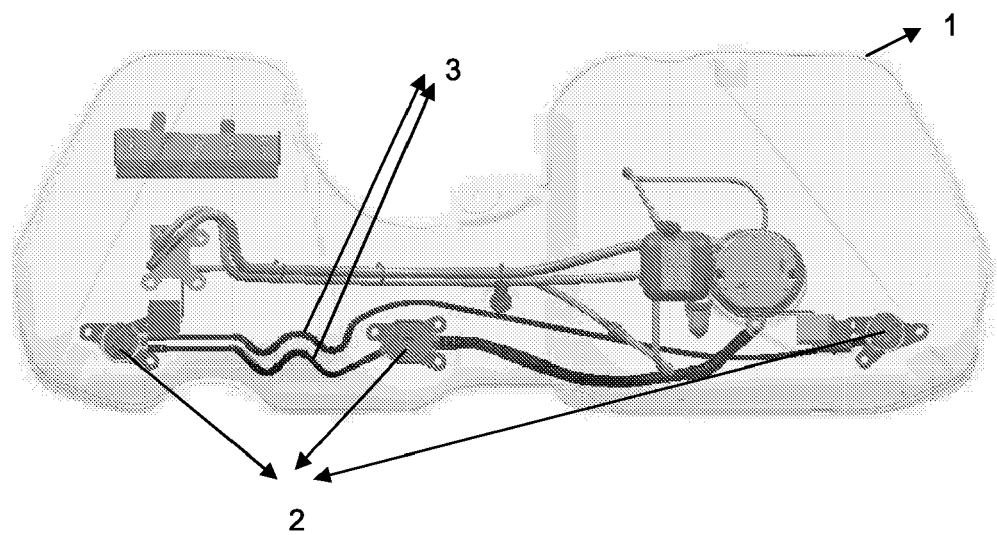
FIG. 1 shows a fuel tank (1) comprising three valves (2) connected together by pipes (3) according to the invention. The pipes (3) have been fixed via their valves (2) during tank blow-moulding, using a core introduced into the blowing mould.
Figure 2:
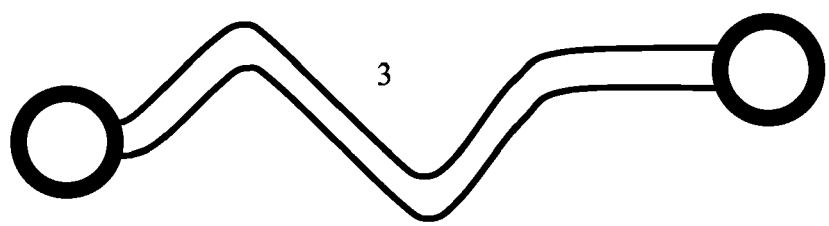
Figure 3:
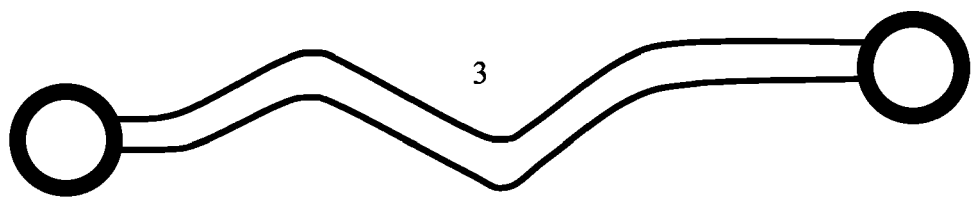
FIG. 3 shows the same pipe as it appears in the stretched state, on the core used to fix it to the tank.

The invention claimed is:

1. A method for manufacturing a plastic fuel tank by molding a parison in which, during the molding operation, a pipe is attached to the parison at at least two points, the pipe being deformable between the two points by virtue of the presence of a bend which is stretched during the attachment of the pipe to the parison.

2. The method according to claim 1, wherein the parison consists of two separate pieces resulting from the cutting of an extruded tubular parison.

3. The method according to claim 1, wherein the pipe is attached to the parison by welding or rivet punching.

4. The method according to claim 1, wherein the pipe comprises, in the region between the two attachment points, at least one bend shaped like an S, V or W, a loop or a corrugation.

5. The method according to claim 4, wherein the bend in the region between the two attachment points is produced by hot deformation.

6. The method according to claim 1, said method comprising:
   two sheets forming the parison are preheated;
   the sheets are preformed by thermoforming them in a mold;
   the pipe is incorporated into at least one of the sheets by a robot;
   the mold is closed again; and
   the tank is molded by thermoforming by pulling a vacuum behind the mold.

7. The method according to claim 1,
   wherein the pipe includes a plurality of ends, and
   wherein the pipe is a ventilation pipe that includes a valve on at least one of the ends of the pipe.

8. The method according to claim 7,
   wherein the pipe includes a valve at each of the ends, and
   wherein the pipe is fixed to the tank via the valves.

9. The method according to claim 7,
   wherein the tank is molded such that it includes several pockets, and
   wherein the method further includes providing a vent valve in at least one of the pockets, and connecting the vent valve to a vent pipe for communication with a canister.

* * * * *